R. E. FOOTE.
ROTARY CUTTER.
APPLICATION FILED DEC. 10, 1919.

1,411,335.

Patented Apr. 4, 1922.

Inventor
Robert E. Foote
By Brown, Boettcher & Diener
Attorneys

UNITED STATES PATENT OFFICE.

ROBERT E. FOOTE, OF HARVEY, ILLINOIS, ASSIGNOR TO SCULLY, JONES & CO., OF CHICAGO, ILLINOIS, A CORPORATION OF ILLINOIS.

ROTARY CUTTER.

1,411,335. Specification of Letters Patent. Patented Apr. 4, 1922.

Application filed December 10, 1919. Serial No. 343,947.

*To all whom it may concern:*

Be it known that I, ROBERT E. FOOTE, a citizen of the United States, residing at Harvey, in the county of Cook and State of Illinois, have invented a certain new and useful Improvement in Rotary Cutters, of which the following is a full, clear, concise, and exact description, reference being had to the accompanying drawings, forming a part of this specification.

The present invention relates to improvements in rotary tools, and has particular reference to an improvement in rotary key-way cutters, whereby to enhance the efficiency of the same without material increase in cost, and to render the operation of the cutter more positive and to more securely support the same in a chuck.

While I shall describe my invention as particularly adapted to that cutter known, on the market, as the Woodruff cutter, I, of course, do not limit myself to its use in that connection. When the Woodruff cutter is used for cutting key-ways in shafts, the cutter has been in the past supported in a chuck, the body of the cutter being made cylindrical throughout. Great difficulty has been experienced in the use of this cutter, owing to the lack of some effective means for firmly gripping the cutter in the chuck against relative rotation therein.

Chucks of ample strength and rigidity for holding tools subjected to continuous load symmetrically disposed about the axis of rotation, are found entirely unsuited for holding a milling cutter subjected to a rapid succession of heavy blows acting along a line offset from the axis of the tool, so as to bend the tool as well as twist it.

With the disadvantages of the cutter as now placed upon the market in mind, I have designed the present improvement with a view to affording a simple, and economic construction of the cutter whereby a positive rotation may be applied thereto, particularly to avoid sticking of the cutter during the functioning of the same. I also have in mind improving the Woodruff cutter whereby the same may be used in combination with the tapered sleeves of my prior patent, issued January 1, 1918, No. 1,252,335.

Figure 1:
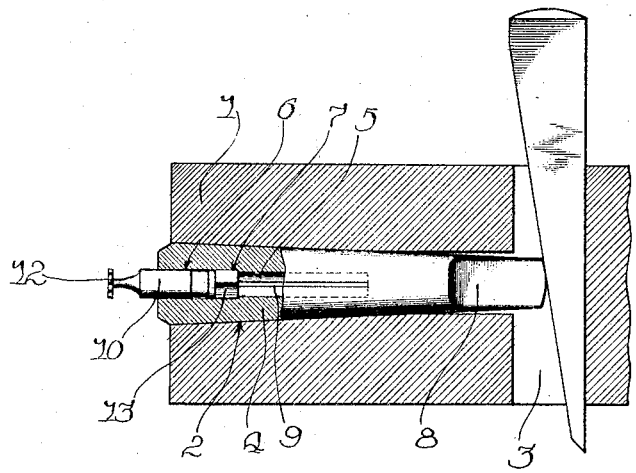
Figure 2:
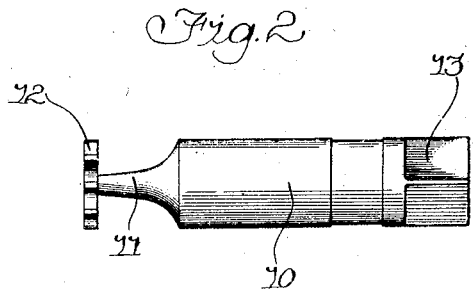

Other objects and advantages to be derived from the improvement of my present invention will appear from the following detail description and the claims, taken in connection with the accompanying drawing, in which:

Figure 1 is a longitudinal sectional view of a tool embodying the improvements of my invention in operative position; and Figure 2 is an elevation of the improved tool.

Referring more particularly to the drawing, 1 designates the spindle of a machine, which may be a suitable machine for cutting key-ways or the like. The spindle is provided with a tapered socket 2 and a transverse slot 3. A tapered sleeve 4, similar in all respects to the sleeve disclosed in my prior patent above referred to, is mounted in the tapered slot 2 and is provided with the bore 5 and counterbore 6. The counterbore is formed with a squared portion 7, similarly to the tapered sleeve of my prior patent. The rear end of the sleeve is flattened as at 8 for engagement in the slot 3 so that the sleeve will be turned positively with the spindle 1. The tapered sleeve 4 is slotted as at 9, to form jaws.

The device of my invention comprises the body portion 10, which is usually cylindrical, the reduced extension 11, and the cutting element 12 carried thereby. The rear end of the tool is, in the present instance, shown squared as at 13, for reception in the squared portion 7 of the counterbore 6 in the sleeve 4.

By squaring the rear end of the tool 10 a firm engagement thereof with the rotating part of the drive element is assured, so that the cutter cannot stick, in the metal being worked, or rotate in the tapered sleeve.

I lay particular stress upon the application of the squared end to a Woodruff cutter, as extreme difficulty has been encountered heretofore in the art in maintaining the cutter rigid in the spindle or chuck. Of course, it is to be understood that the end of the tool need not be squared, but may be flattened, or may be polygonal in shape in order to suit various shapes of openings which might be made in the sleeve 4.

The tool may as readily be applied to other types of sleeves or chucks than that shown, but has been found to be particularly efficient in the combination shown.

I do not limit myself to the details as shown and described.

I claim:

1. A rotating cutter subjected during the cutting operation, to loads asymmetrical with respect to the axis of rotation, said cutter having a cylindrical shank for support and guidance thereof, and a squared end for positively transmitting torque thereto.

2. In combination with a rotating cutter subjected during the cutting operation to loads asymmetrical with respect to the axis of rotation, a sleeve having resilient sectors for gripping the shank of said cutter, and a tapered socket receiving said sleeve, said sleeve and socket having gripping engagement with each other only throughout a relatively small portion of the length of said sleeve, immediately adjacent the shank of said cutter.

3. In combination with a rotating cutter, subjected during the cutting operation to loads asymmetrical with respect to the axis of rotation, a sleeve having a rigid portion and a resilient portion, said resilient portion comprising sectors adapted to receive and grip the shank of said cutter, and a tapered socket receiving and supporting said sleeve by gripping engagement with its resilient portion only.

4. In combination with a rotating cutter subjected during the cutting operation to intermittent loads asymmetrical with respect to the axis of rotation, a sleeve having resilient sectors for gripping the shank of said cutter, and a tapered socket receiving said sleeve, said sleeve and socket having gripping engagement with each other only throughout a relatively small portion of the length of said sleeve, immediately adjacent the shank of said cutter.

In witness whereof I hereunto subscribe my name this 6th day of December, 1919.

ROBERT E. FOOTE.